Sept. 15, 1959  C. S. HAZARD ET AL  2,904,251
AUTOMATIC RESETTING PREDETERMINING REGISTER
Filed March 15, 1957  3 Sheets-Sheet 2

FIG. 2.

INVENTORS
CHARLES S. HAZARD
JOSEPH F. COLES
BY
ATTORNEY

+ # United States Patent Office 2,904,251
Patented Sept. 15, 1959

2,904,251

AUTOMATIC RESETTING PREDETERMINING REGISTER

Charles S. Hazard, New York, and Joseph F. Coles, Valley Stream, N.Y., assignors to Neptune Meter Company, a corporation of New Jersey Application March 15, 1957, Serial No. 646,350

24 Claims. (Cl. 235—132)

This invention relates to registers and more especially to registers for predetermining the count of units of measurement. The invention particularly relates to a predetermining register which automatically resets to the desired preset count during the terminal period of a cycle of a series of cycles of operation of a control device to which the register is connected for registering the count of the units passing the control device in the cycle.

It has been proposed heretofore to preset a register for counting a predetermined number of units and to reset the register during a predetermined number of counts or digits leading to the initial or zero position. In the patent to Wyeth 2,313,189, March 9, 1943, this has been accomplished by utilizing both a set of predetermining wheels and a set of counting wheels, the predetermining wheels being set to ten units less than the number of counts actually required. After this preset count is counted off on the predetermining wheels the preset counting mechanism is disengaged and the reset mechanism is engaged for the remaining ten counts on the counting register during the resetting of the predetermining wheels to the desired predetermined number and return of the counting wheels to zero. The mechanism of this patent requires an auxiliary eccentric shaft in addition to the shaft on which the two sets of register wheels are mounted.

It is an object of the invention to provide a predetermining register which during the cycle directly indicates the count to be completed and which may be connected to a control device, for example, a valve controlling the flow of fluid being measured by a meter, or the delivery of pieces produced in a production machine, or the repeated measuring or predetermined lengths of material moved lengthwise of an elongated strip thereof, to determine completion of the cycle.

It is another object of the invention to provide a directly indicating predetermining register which, during the cycle of operation thereof in control of a device for a purpose such as those just referred to, will automatically initiate and will complete the resetting of the register to the desired count precisely upon completion of the predetermined count, so that the next cycle of counting may proceed immediately without further resetting or adjustment.

It is a further object of the invention in such an automatic directly indicating resetting predetermining register to provide for setting to any desired predetermined count at will.

It is a still further object of the invention to effect actuation of the controlled device as determined by the register in one or a plurality of steps, so as to provide, if desired, for slowing down the flow or delivery of the material and for final stop at completion of the predetermined count in the cycle.

It is an important feature of the invention that control of the controlled device is transferred from the predetermining register as a counting register to a mechanism for resetting this register always at a predetermined number of counts or digits from the end of the cycle regardless of the preset indication, and so that during this terminal period of the cycle the controlled device may be operated in one or a plurality of steps to its stopped condition.

In accordance with the above stated objects of the invention the numeral wheels of the predetermining register are mounted on a reset shaft. This reset shaft may be of conventional form cooperating with the predetermining wheels to reset them to the desired predetermined count upon rotation of this shaft. On this reset shaft also is mounted and secured to the shaft for rotation therewith a reset member which comes into operation at a predetermined digit indication on the predetermining register in its operation from the predetermined count to the position corresponding to zero indication at which the controlled device shall have become operated to the stopped position. It is a significant aspect of this feature of the invention that the presetting register is operated in the normal manner during the portion of the count which precedes the predetermined digit indication, at which indication its further operation is transferred to the reset member which is mounted on the reset shaft. Thereafter, the register not only is reset to the predetermined count by the reset member and shaft but the operation is completed to finish the cycle and the device controlled is operated to its stopped position as if the register had continued to operate to the initial or zero indication.

The predetermining register of the invention may utilize for the normal operation thereof from the predetermined count conventional means including intermittent unidirectional actuating means and transfer elements to secure step by step rotation of the numeral wheels and the indexing of the wheels of higher order at predetermined positions of the wheels of next lower order. Actuating means providing intermittent step by step operation of the reset member secured to the reset shaft also is utilized and, in accordance with the significant aspect of the invention above referred to, transfer is effected of the drive of the predetermining register from the conventional actuating means for counting operation of the register to the actuating means for resetting operation thereof through the reset member and the reset shaft. This transfer in accordance with the broad concept of the invention may be effected at any desired predetermined digit indication which the predetermining register is designed to reach in its operation but preferably will be effected when the digit indication is such as would require further counting of eleven digits in the rotation of the two lowest order numeral wheels to reach zero if the register were not reset until zero were reached.

In this preferred embodiment of the invention the digit indication of 011 is utilized, as more fully described hereinafter, to determine the point at which the transfer is initiated, so that during rotation of the numeral wheel of lowest order one digit to the digit indication 010 the transfer will be effected to the reset member. The resetting operation then starts with the next step of movement from the digit indication 010 and continues for ten steps in the rotation corresponding to the conventional resetting operation of the reset shaft in a single rotation in order to carry the numeral wheels to the predetermined count. This conventional action of the reset shaft itself may be accomplished by reset pawls which within the respective numeral wheels engage a longitudinal groove in the reset shaft when this shaft is rotated in the resetting operation. In such operation all of these reset pawls and, therefore, the carriers and the numeral wheels thereon are brought to predetermined positions relative to each other and relative to the reset shaft. In these positions the predetermined count is reached, the selected indication of this count being determined by setting the respective numeral wheels on their carriers with respect to which these numeral wheels are made rotatable and may be held in the set position by conventional detent means within the numeral wheels. It will be understood, therefore, that the rotation of the reset shaft in ten steps by the intermittent engagement of the actuating means with the reset member corresponds to the ten digits of counting which would have been carried out on the predetermining counter if it had proceeded to operate to the initial or zero setting without resetting.

The invention further provides for transfer back to the counting operation of the numeral wheels and the disengagement from the reset member so as to stop the resetting operation precisely upon the register reaching the preset predetermined count. Thereafter, the register may proceed in the counting operation again to count the desired number of units. This counting preferably is effected in the decreasing direction so that as the register proceeds toward zero the predetermined digit indication of 011 will be reached for transfer to resetting.

It is an additional feature of the invention that a trip element which is operatively connectible to the controlled device is actuated by the reset member. Such actuation takes place concomitantly with completing the resetting of the register to the predetermined count to hold the trip element in a control position as the register proceeds in the counting operation to and including the step from the predetermined digit indication 011 to the digit indication 010. In the next or a succeeding step, however, during the resetting operation of ten steps of rotation of the reset member, as above referred to, the trip element is released from the reset member for actuation of a trip member which is connectible to the controlled device to produce an initial movement of the trip member in a given direction and operation of the controlled device in a first step of its operation toward the stop position. During the remainder of the resetting operation of the register the trip element remains in this release position until in the last step of resetting to the predetermined count the trip element again is actuated by the reset member to effect movement of the trip member in the opposite direction for final releasing or stopping operation of the controlled device. The trip member may be connected to controlled devices of various character, as above indicated, which may require themselves to be reset to operating position in cooperation with the trip member for flow or movement of the material in the next cycle of measurement.

The reset shaft in the register of the invention also may be operated manually or by separate means to effect at will resetting of the register to the predetermined count. Preferably such manual operation is utilized to bring the register again to the preset selected predetermined count before changing this preset count to a different selected predetermined count by rotating the respective numeral wheels on their carriers as above mentioned. The construction of the mechanism for driving the register and of the operative connections thereof of the numeral wheel and to the reset member are such as to provide for such manual operation of the reset shaft.

Another feature of the invention relates to means for effecting selectively the setting of the respective numeral wheels on their carriers to the desired predetermined count. This selective setting means provides elements which are actuatable to and from positions of engagement with the respective numeral wheels for effecting step by step rotation of these numeral wheels with respect to their carriers. Means also are provided for holding the carrier against rotation when the actuated element engages the numeral wheel for effecting such rotation thereof so that the desired step by step setting of the numeral wheel on the carrier is insured.

Other objects and features of the invention will be understood from the description of the drawings to follow in which.

Figure 1:
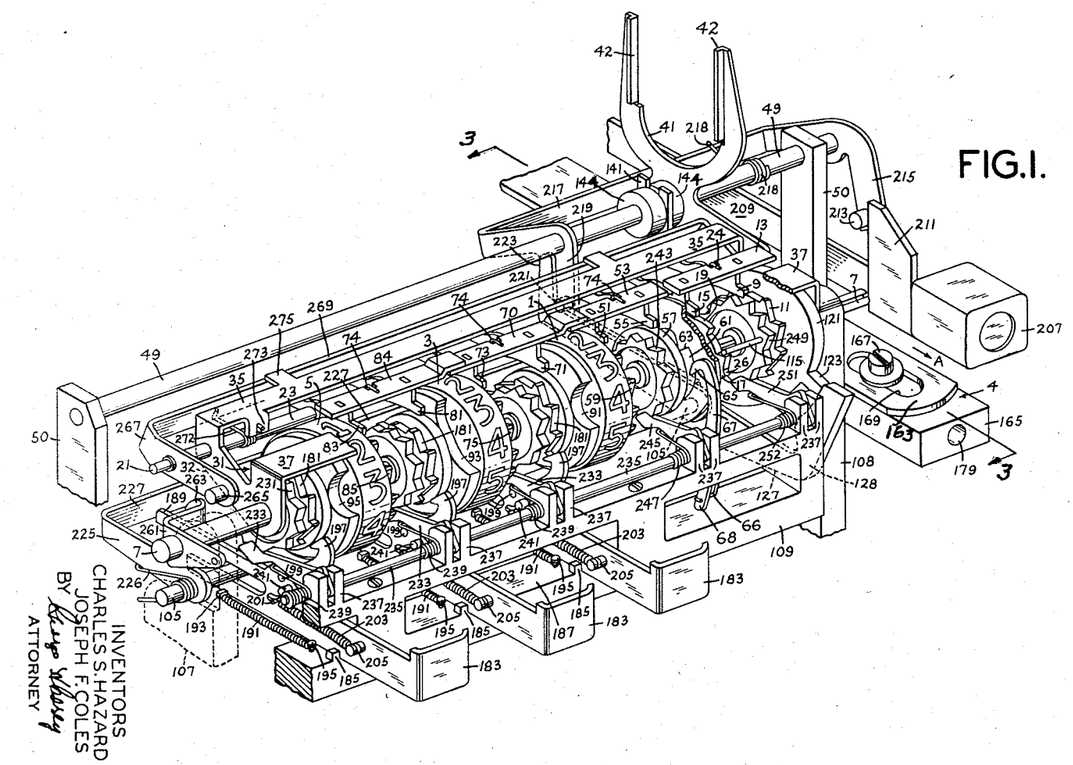
Fig. 1 is a perspective view of the register with the reset member in the position just completing the resetting of the numeral wheels to a selected predetermined count.

The predetermined count, taken by way of example, in Fig. 1 is the number 344 the digits of which are disposed on the three numeral wheels shown in this figure in a horizontally aligned position which may be determined by a suitable window in a casing or by other marking means for marking the count or reading of the register. As will be understood from the description to follow, resetting of the numeral wheels 1, 3 and 5 just has been completed to this position by the operation of the first numeral wheel in one step and of the reset shaft 7 in 10 steps, that is, in 11 steps from the digit indication 011 referred to above which is utilized to determine the point in the operation at which transfer is made from the counting operation to the resetting operation. The last step of one-tenth revolution of the reset shaft has carried the numeral wheels 5, 3, 1 from the indication 455 to the indication 344 and was effected by the reset pawl 9 engaging a tooth of the reset ratchet member 11 having ten teeth which is secured to the reset shaft 7 to effect rotation in ten steps.

The pawl 9 is rigidly connected by a bridge piece 13 to a holdout pawl 15 which engages holdout cam 17. The form of this holdout cam may be seen in Figs. 1 and 2. In the position of this cam in Fig. 1 the toe of the pawl 15 is resting on the portion 19 of this cam of reduced radius. The pawls 9, 15 which are pivotally supported on the shaft 21 and disposed in positions along and spaced apart on shaft 21 by collars 23 are biased by spring 24 extending about the shaft 21 and suitably engaging these pawls to move the toes of the pawls downwardly in Fig. 1 respectively into engagement with the ratchet member 11 and the cam 17. Upon reciprocating movement of the pawls 9, 15 effected by means about to be described, the pawl 9 may move backwardly over a tooth of the ratchet member 11 into position to engage the next tooth. Upon forward movement of the pawl 9 the ratchet member 11 is rotated clockwise in Fig. 1 to rotate the reset shaft 7. In this step by step rotation of the shaft 7 the numeral wheels which respectively carry conventional internal reset pawls which in succession are picked up by a V-shaped groove 25 of the reset shaft are rotated to the position of the selected predetermined count 344. In the backward movement of the pawls 9, 15 from the position shown in Fig. 1 the pawl 15 rides upon the high lobe 27 of the cam 17 and the reset pawl 9 then is held out of position to engage the teeth of the ratchet member 11, so that in the next forward movement of the pawls 9, 15, the ratchet member 11 and the reset shaft 7 will not be rotated. The register now is in position to start the normal counting operation which for the purposes of this invention preferably is effected in the decreasing direction of the digits. This will be accomplished as will be seen in Fig. 1 by the clockwise rotation of the numeral wheels.

Figure 3:
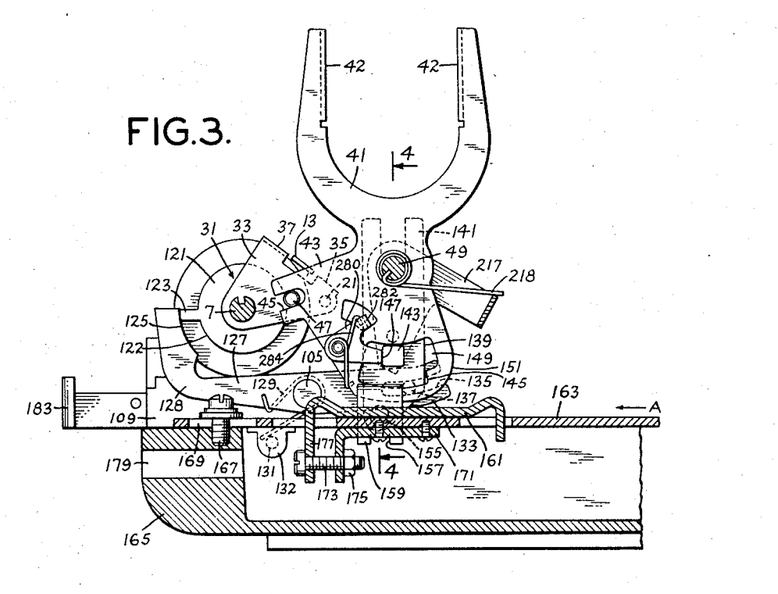
Fig. 3 shows a section on line 3—3 of Fig. 1.
Figure 4:
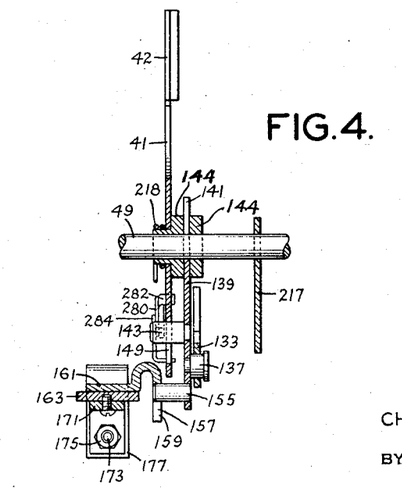
Fig. 4 is a section on line 4—4 of Fig. 3.

The shaft 21 on which the pawls 9, 15 are pivotally supported, as are other pawls about to be described, is carried in a frame 31 having an end member 32 at the left in Fig. 1 and at the right an end member 33 not visible in Fig. 1 but shown in Fig. 3. This frame 31 also is provided with two bars 35, 37 which extend parallel to the reset shaft and connect the end members 32 and 33 to form therewith a rigid frame. The frame 31 is supported for pivotal movement on and relative to the reset shaft 7. In such reciprocating pivotal movement the several pawls, as mentioned above, are moved backwardly in Fig. 1 and then forwardly to engage ratchets to effect the clockwise rotation of the shaft 7 or of the individual numeral wheels as the case may be. The reciprocating movement of the frame 31 is effected by forked member 41 having a laterally extending portion 43, Fig. 3, formed with an open end slot 45 in which a pin 47 carried by the end member 33 of the frame 31 is disposed which engages the two forks of the portion 43. The forked member 41 is pivotally supported on fixed shaft 49 carried in uprights 50 of the supporting structure of the register so that upon reciprocating pivotal movement of the forked member 41 reciprocating pivotal movement of the frame 31 is effected to produce the forward and backward movements of the pawls referred to above.

Figure 2:
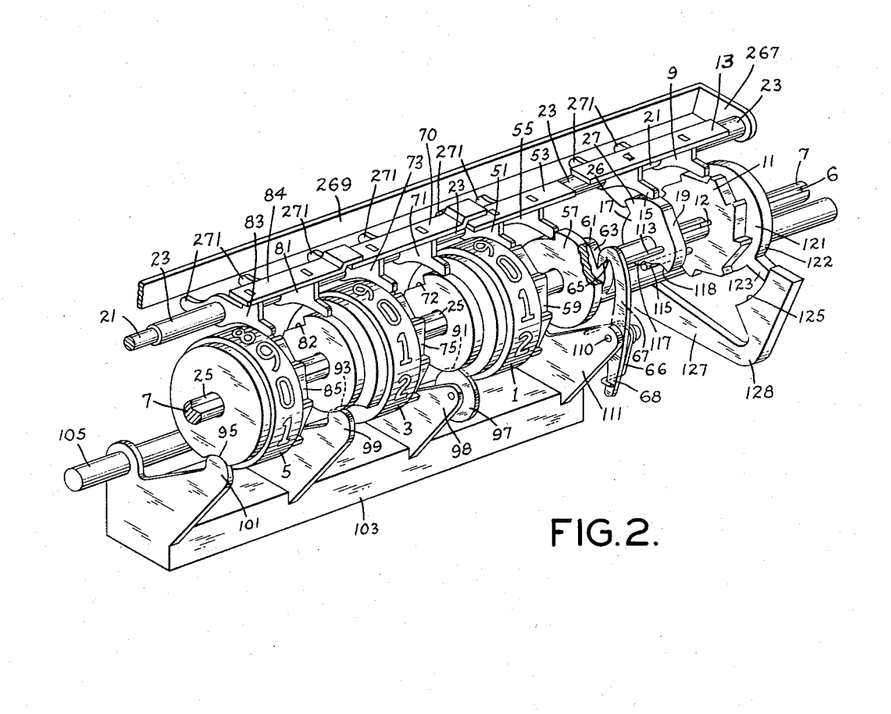
Fig. 2 is a perspective view of the register with certain elements omitted, the essential parts being in the position for initiating transfer to resetting operation.

Pivotally supported on the shaft 21 is a feed pawl 51, Figs. 1 and 2, connected by bridge 53 to holdout pawl 55. In the backward movement of the frame 31 from the position shown in Fig. 1 the holdout pawl 55 which has been in position to ride upon the lobe of the cam 57, so that the feed pawl 51 is held out of engagement with the ratchet teeth 59 of the numeral wheel 1, falls behind the toe of the cam 57 and under the bias of the spring 74 which actuates the pawls 51, 55 the pawl 51 falls into engagement with the ratchet teeth 59. In the next forward movement of the frame 31 and of the pawls 51, 55 the numeral wheel 1 of lowest order will be rotated $\frac{1}{10}$ of a rotation on and relative to the shaft 7. In this rotation the holdout pawl 55 engaging the toe of the cam 57 also rotates this cam $\frac{1}{10}$ of a revolution. This rotation of the cam 57 at the same time effects rotation of a one tooth ratchet or cam 61 secured to cam 57 and having a notch 63 to a position in which the toe 65 of a hook pawl 67 will engage the notch 63 upon upward movement of the pawl 67 as described below.

Upon continued reciprocation of the forked member 41 which may be accomplished, for example, by an eccentric secured to a suitably disposed rotating shaft and bearing on the surfaces 42 of this forked member, the pawl 51 bridged to the pawl 55 engages in succession the teeth of the ratchet 59 to rotate the numeral wheel 1 of lowest order in steps of $\frac{1}{10}$ of a rotation until the holdout pawl 71 bridged by bridge 70 to the feed pawl 73 associated with the second numeral wheel 3 drops in a deep notch 72 of the holdout cam of the numeral wheel 1, this notch 72 not appearing in Fig. 1 but shown in Fig. 2, to permit the pawls 71, 73 to move downwardly under the bias of their spring 74 by pivotal movement on the shaft 21 to bring the feed pawl 73 into engagement with the teeth of the ratchet 75 of the carrier on which the second numeral wheel 3 is carried. This action effects the indexing rotation of the second numeral wheel when the first numeral wheel passes from indication of the digit 0 to indication of the digit 9, concomitantly with movement of the second numeral wheel from the position showing the digit 4 to the position showing the digit 3, or from any digit to the next lower digit.

Similar indexing action takes place by engagement of the holdout pawl 81 in the deep notch 82, Fig. 2, to effect rotation of the third numeral wheel 5 from the position shown in which the digit 3 is indicated to the position in which the digit 2 will be indicated, the feed pawl 83 connected by bridge 84 to the pawl 81 engaging the teeth of the ratchet 85 of the third numeral wheel 5.

The indexing action effected by the respective holdout pawls 71, 81 upon entering the deep notches 72, 82 respectively associated with the first numeral wheel 1 and the second numeral wheel 3 and cooperating with the feed pawl 73, 83 is accomplished by elements which are conventional. Each of the bridge pieces 70, 84 is provided with a portion which overlaps the next adjacent bridge piece to the right. This effects the lifting of all of the pawls to the left upon lifting of a given pawl so as to prevent engagement with the respective ratchets when such given pawl is held out of engagement with the ratchet of the associated numeral wheel. On the other hand, when such given pawl associated with a wheel of lower order is in position to engage its ratchet, the pawl of the next higher order wheel may move into engagement with its ratchet when the holdout pawl bridged thereto is moved into the deep notch of the holdout cam of the wheel of lower order. It will be noted, however, that no lapping portion is provided between the bridge piece 53 of the pawls of lowest order wheel 1 and the bridge piece 13 which carries the pawls 9, 15 associated with the reset ratchet 11.

When by continued reciprocation of the forked member 41 the numeral wheels have been rotated and indexed one with respect to the other in the decreasing order of the digits thereon, as described, from the indication 344 until the indication 011 is reached, the counting operation will have proceeded through the count of 333 units. If the operation were continued in this manner to complete the count of 344 units, 11 more reciprocations of the forked member 41 and 1.1 rotation of the lowest order numeral wheel would be required. When in the device being described, however, the indication 011 is reached the numeral wheels are in positions in which the notches 91, 93, 95 respectively formed in discs attached to the numeral wheels 1, 3 and 5 are in the positions shown in Fig. 2 in which the roller 97 carried on arm 98 engages the notch 91 of the numeral wheel 1 and the rounded end of the arm 99 engages the notch 93 of the numeral wheel 3 and the rounded end of the arm 101 engages the notch 95 of the wheel 5. The arms 98, 99, 101 are rigidly carried by bar 103 which is pivotally supported as shown in Fig. 2 on a fixed shaft 105 which may be supported in standards 107, 108 carried by the rigid frame 109, Fig. 1. When the roller 97 and arms 99, 101 engage the respective notches 91, 93, 95 the indication of the register will always be 011 because of the angular disposition of these notches with respect to the digits of the respective numeral wheels.

With the numeral wheels 1, 3, 5 shown in the position of Fig. 2 the bar 103 and the arms carried thereby have been pivotally moved counterclockwise about the shaft 105 under the bias of a spring not shown. Such counterclockwise movement of the bar 103 effects movement upwardly in Fig. 2 of the hook pawl 67 which is pivotally supported on pin 110 secured on arm 111 also rigidly carried by the bar 103. The hook pawl 67 is biased to move the hook thereof into engagement with the notch 63 of cam 61 by spring 66 engaging the depending end 68 of the hook pawl 67, this spring also suitably engaging the arm 111.

The notch 63 of the cam 61 is of such form that when engaged by the hook pawl 67 downward pull of the hook pawl will effect rotation of the cam 61 together with the cam 57 $\frac{1}{10}$ of a rotation as the first numeral wheel is rotated by its feed pawl 51 engaging ratchet 59 from the indication 011 to the indication 010. The downward movement of the hook pawl 67 is effected by camming action of the notch 91 of the wheel 1 acting on the roller 97 pivotally supported on the arm 98, thus producing clockwise rotation of the bar 103 about the axis of the shaft 105. During this action only the numeral wheel 1 is rotated but the arms 99, 101 also are moved out of the respective notches 93, 95 since the bar 103 and the arms are a rigid unit. In the $\frac{1}{10}$ rotation of the cam 61 thus effected by the hook pawl 67, the cam 57 also is rotated clockwise $\frac{1}{10}$ of a rotation to the position in which the holding pawl 55 rides upon the high portion of this cam and thereafter holds the feed pawl 51 out of engagement with the ratchet 59 of the numeral wheel 1.

In the rotation of the cam 61 by the pawl 67, moreover, the cam 17 also is rotated clockwise $\frac{1}{10}$ of a rotation, these two cams 61 and 17 being connected by a suitable mechanical connection represented in Fig. 2 by the pin 113. When the hook pawl 67 has been moved downwardly in Fig. 2 to rotate the cam 61 and the cam 17

1/10 of a revolution clockwise, the holdout pawl 15 rides on the lobe 27 of the cam 17 and in the reverse movement of the forked member 41 and backward movement of frame 31 from the position shown in Fig. 1 the toe of the pawl 15 drops behind the toe 26, Fig. 2, of the cam 17 and the reset pawl 9 drops into position to engage the teeth of the reset ratchet member 11. In the next stroke of the forked arm 41, therefore, to move the frame 31 forwardly clockwise in Fig. 1, the pawl 9 will effect 1/10 of a rotation of the ratchet member 11 and of the reset shaft 7 to which the ratchet member is keyed by key 12 engaged in keyway 6 of the reset shaft 7.

This rotation of the ratchet member 11 and of the reset shaft 7 is continued for 9 more steps from the indication 010 concomitantly with reciprocating movement of the forked member 41 to complete the resetting of the register to the original predetermined count of 344. It will be understood that such completion of the resetting is accomplished in these ten steps which correspond precisely to the ten steps which would be required to complete the counting operation if the counting had been continued to zero, such completion of the restting being accomplished after the mechanism has effected the change to operation of the reset ratchet member 11 from actuating the first numeral wheel 1 by the feed pawl 51.

During the rotation of the reset ratchet member 11 in these ten steps the holdout cam 17 is first rotated by engagement of the pawl 15 of the toe 26 of the cam 17, thus effecting 1/10 of a rotation of this cam together with the cams 61, 57 1/10 of a rotation. The step by step rotation of the ratchet member 11 continues until a pin 115, Fig. 2, carried by the ratchet member 11 engages the toe 117 of the cam 17 to rotate this cam and the cams 57, 61 until the ten steps of rotation are completed and the register is reset to the predetermined count 344 in which position, as above explained, the holdout pawl 15 again rides on the high lobe 27 of the cam 17 to hold the pawl 9 out of engagement with the ratchet member 11 and the holdout pawl 55 bridged to the feed pawl 61 drops behind the toe of the cam 57 to provide for engagement of the feed pawl 51 with the teeth of the ratchet 59 as shown in Fig. 2. The counting operation from the predetermined count 344 in the second cycle, therefore, starts with the next stroke of the forked member 41 and the forward movement of the frame 31.

Secured to the reset shaft 7 and rotating with the reset ratchet member 11 is a circular disc 121 which carries a trip lug 123 projecting generally radially therefrom. The trip lug 123 in the position shown in Figs. 1, 2 and 3 engages an arcuate surface 125 of a trip element 127 which is pivotally supported on the shaft 105 and biased into engagement with the lug 123 or with the cylindrical surface 122 of the disc 121, depending on the position of the reset ratchet member 11. This bias is afforded by a spring 129 wrapped about shaft 105 and engaging one arm of the trip element 127 and engaging a pin 131 carried on a lug 132 depending from the frame 109 of the register.

In the position of the parts in Fig. 1 the trip lug 123 has just moved into engagement with the arcuate surface 125 and has moved the end of the arm 128 of the trip element 127 downwardly. During the counting operation in which the numeral wheels are rotated clockwise in Fig. 1 in the direction of decreasing order, because the ratchet member 11 at this time is not being rotated, the disc 121 and its lug 123 remain in the position shown and the trip element 127 remains depressed. This position is maintained also during the rotation of the first numeral wheel together with the cams 57, 61, 17 in passing from the indication 011 to the indication 010. Since in the next backward movement of frame 31 the drive is now transferred to the resetting operation and the ratchet member 11 starts to move on the next forward movement of frame 31, the ratchet member 11 now being engaged by the pawl 9, the lug 123 moves downwardly in engagement with the surface 125 for one or more strokes of the forked member 41 until the lug 123 is out of engagement with the arcuate surface 125, the arm 128 of the trip element 127 under the bias of the spring 129 then being moved upwardly in Figs. 1, 2 and 3 so that the arcuate surface 125 of this element engages the cylindrical surface 122 of the disc 121.

The trip element 127 is provided with a rearwardly extending forked arm 133, Fig. 3, forming an arcuate slot 135 in which is disposed a pin 137 carried by a slide member 139 movable generally vertically, the pin 137 engaging the forked arm 133. The upper end 141 of the slide member 139 also is forked, the forked arms thereof extending vertically on either side of the fixed shaft 49 on which the forked member 41 is pivotally supported. The shaft 49 together with collars 144 secured on the shaft cooperate with the forked arms 141 to guide the slide member 139 for upward and downward movement thereof while also providing for a pivotal movement of this slide member relative to the shaft 49 effected in the manner about to be described.

During such pivotal movement the pin 137 carried by the slide member 139 moves forwardly and reversely along the arcuate slot 135 of the forked arm 133. The length of the forked arms 141 is sufficient to provide for vertical movement of the slide 139 with the pin 137 in slot 135 corresponding to the pivotal movement of the trip element 127 and arm 133, so that a square peg 143 which is carried by the slide member 139 may move between two vertically spaced levels and so that this square peg 143 in the two levels may move horizontally when engaged by one or the other of two vertically extending horizontally spaced edges 145, 147 of an opening 149 of particular outline provided in the depending portion 151 of the forked member 41. The edges 145, 147 upon engagement respectively with the opposite vertically extending faces of the square peg 143 effect pivotal movement of the slide member 139 respectively clockwise and counterclockwise in Fig. 3 comcomitantly with reciprocating movement of the forked arm 41. The outline of the opening 149 is such that when the square peg 143 is at the respective levels clearance is provided for the reciprocating movement of the depending portion 151 of the forked member without interference by the square peg 143.

It will be understood from a consideration of Fig. 3 that, as the trip element 127 has just moved into the position shown in Figs. 1, 2 and 3, the square peg 143 is disposed at the upper level for engagement by the edge 147. Pivotal movement of the forked arm 41 in the counterclockwise direction now is taking place to move the peg toward the right as the frame 31 is moved backward or clockwise in Fig. 3. Correspondingly with the ped 143 disposed at the lower level when the trip element 127 has been moved clockwise in Fig. 3 after the lug 123 moves out of engagement with the arcuate surface 125 to engage the surface 125 with the cylindrical surface of the disc 121, the edge 145 then may engage the peg 143 in a clockwise movement of the forked arm 41 to move the peg toward the left in Fig. 3, the slide member 139 correspondingly moving clockwise. It will be clear that the movements of the peg 143 toward the right and toward the left in Fig. 3 occur with the pivotal movement of the slide member on the shaft 49 above referred to and that the movements of the peg 143 between the two levels referred to occur with sliding movement of the slide member 139 and sliding movement of the forked arms 141 along the shaft 49.

The mechanism which has been described for effecting movement of the peg 143 by the action of the trip lug 123 upon the trip element 127 is provided in order to produce in two steps tripping action of a control device, for example, a valve controlling the flow of a fluid to be measured by a meter. The first of these steps may produce partial closing of the valve, for example, and is effected when the trip lug 123 has moved out of engagement with the surface 125 as above described and clockwise rotation in Fig. 3 of the trip element 127 occurs resulting in downward movement of the slide 139 and of the square peg 143. When this downward movement occurs the next stroke of the forked member 41 in the clockwise direction produces counterclockwise movement of the frame 31 on the reset shaft during the resetting operation as above described and concomitantly brings the edge 145 into engagement with the peg 143, so that this peg is moved toward the left in Fig. 3, that is, forwardly in the direction of the arrow A, Fig. 1.

In order to utilize this forward movement of the peg 143 for initial tripping of the control device, the slide member 139 carries a pin 155 which is engaged in a slot 157 formed in the forked bracket 159 attached to a piece 161 which is supported adjustably on the upper face of a slidable trip member 163 which in the embodiment being described is in the form of a flat bar supported for sliding movement on the base 165, a screw 167 being tapped in the base 165 and engaged in a slot 169 formed in the end of the trip member 163 to provide for to and fro sliding movement of this trip member concomitantly with movement of the forked bracket 159 engaged by the pin 155 in the pivotal movement of the slide member 139 as described.

The adjustable piece 161 may be held in position on the slidable trip member 163 by means of an angle bracket 171 screwed to the under side of the slidable trip member 163, an adjusting screw 173 being threaded in a nut 175 welded or otherwise secured to the bracket 171 and passing through an opening in the depending leg 177 of the piece 161. The head of the screw 173 may be reached through an opening 179 in the base 165 so that the position of the piece 161 may be adjusted with respect to the slidable trip member 163, thereby to adjust the position of the slide member 163 relative to the square peg 143 so as to secure proper action with respect to the controlled device, such as the valve.

When, after continued rotation during the resetting operation of the reset ratchet 11 rotating the disc 121 and its lug 123, this lug again comes into engagement with the end of the trip element 127 and effects pivotal movement of this trip element to the position shown in Figs. 1, 2 and 3, the square peg 143 will be raised to the position shown in Fig. 3. This raising of the square peg occurs during the last $\frac{1}{10}$ of a rotation of the ratchet member 11 as the numeral wheels come into position of the predetermined count 344 as the frame 31 moves forwardly. In the reverse movement of the frame 31 effected by the forked member 41, the edge 147 coming into engagement with the square peg 143 and effecting pivotal movement of the slide member 139 and movement toward the right of the pin 155, as described, effects movement of the slidable trip member 163 toward the right. This movement of the slidable trip member 163 is utilized to produce the final tripping action of the control device, for example, the final closing of a valve. It will be noted that this final movement of the trip member 163 is in the opposite direction to the initial movement of this member which secured, for example, partial closing of the valve.

It thus will be clear with respect to the embodiment being described that the initial movement is effected after the resetting operation has started, for example, during the first one or more tenths of the rotation of the reset member 11, and that final closing movement is effected after completion of the count and concomitant resetting of the register to the predetermined count, that is, to 344 as above described, but precisely upon finishing the return movement of the frame 31 by the operation of the forked member 41.

As the resetting operation is carried out during counting of a predetermined final number of digits of the count and not after completion of the count, and having regard to the action of the trip member 163 as described, it will be understood that the final tripping action is effected only after completion of the count and of the resetting and within the time period of the return movement of the forked member immediately following the forward movement thereof which produces the final one-tenth rotation of the reset member 11 to move the numeral wheels to the predetermined count.

As above stated the embodiment described utilizes a conventional construction of the numeral wheels and internal reset pawls engaging the groove in the reset shaft. These numeral wheels are supported on carriers for rotation relative to the carriers on the axis of the reset shaft. The internal reset pawls are carried by the respective carriers. Upon continuous rotation of the reset shaft until all of the internal reset pawls engage the groove in the shaft, the carriers all will be disposed on the shaft in the same relation to the groove. These carriers and the respective wheels are also provided with conventional internal detent pawl and ratchet means which in the selective setting provides for step by step rotation of the numeral wheel on its carrier and insures holding the numeral wheel in each position to which it is rotated with respect to the carrier, that is, for each $\frac{1}{10}$ of the rotation of the numeral wheel on the carrier. As the feed pawls 51, 73, 83 engage their respective feed ratchets, the feed ratchet being secured to the corresponding carrier for rotation therewith, the carrier is rotated $\frac{1}{10}$ of a revolution for each tooth of the feed ratchet. The numeral wheel, therefore, as it is rotated on its carrier only in steps of $\frac{1}{10}$ of a rotation, always will be moved to a definite integer position relative to the carrier and to the feed ratchet, as well as relative to the reset shaft groove.

In order to carry out such presetting each of the numeral wheels has secured thereto adjacent the indexing discs which carry the deep notches 72, 82 a selecting or presetting ratchet 181, Fig. 1. The teeth on these ratchets are disposed for rotation clockwise in Fig. 1 to produce the selective rotation of the numeral wheel in the decreasing order of its digits. Preferably the body of the numeral wheel, the camming disc providing the notch 91, 93, 95, the indexing disc and the preset or selecting ratchet all are made in one piece as a die casting. For effecting the selective presetting of the numeral wheels keys 183 are supported for sliding movement in engagement with the frame 109, being guided by lugs 185 with the forward part of the keys resting on the horizontal face 187 of the frame 109. Additional lugs not visible in Fig. 1 may be provided at the opposite sides of the lengthwise extent of the keys 183 from the lugs 185. The opposite end 189 of each of the keys 183 is forked as may be seen for the extreme left hand key 183 in Fig. 1, the forked ends being disposed respectively above and below the shaft 105. Each of the keys 183 is biased forwardly toward the right in Fig. 1 by a spring 191 which engages a lug 193 carried by the lower fork of the key 183, this spring extending between this lug and a pin 195 fixed in the frame 109. Each of the keys is provided with a laterally extending flat portion which may be pressed individually by the thumb against the bias of the spring 191.

As shown in Fig. 1, a hook pawl 197 is provided for each of the numeral wheels and is supported for pivotal movement on a pin 199 which is secured to the key 183 adjacent its upper edge. A lug 201, shown for the extreme left hand key in Fig. 1, is carried by the pawl 197 and extends through an arcuate slot in the key 183. Tension springs 203 are attached to these lugs of the respective pawls 197 and at their other ends are attached to pins 205 carried by the keys 183. When a key 183 is pressed toward the left in Fig. 1 lengthwise of its extent, the tension spring 191 is stretched and the hook of the hook pawl 197 is brought into engagement with a tooth of the ratchet 181 of the adjacent numeral wheel.

Such engagement is accompanied by pivotal movement of the pawl 197 on its pin 199 against the bias of the spring 203 as the sloped edge of the pawl engages the sloping surface of the ratchet tooth upon continued movement of the key toward the left. The key and the hook pawl are effective to rotate the ratchet 181 and the numeral wheel connected thereto 1/10 of a rotation for each stroke of the key 183, there being 10 teeth in the ratchet 181. The extent of the movement of the keys may be limited by suitable stops to insure that only one tooth of the ratchet 181 is engaged per stroke of the key.

In order to prevent inadvertent setting of an individual ratchet and wheel by pressing one or the other of the keys, provision is made which requires the operation of a stop button 207 which is connected by a bar 209 and by suitable means not shown to the tripping mechanism of the control device, so that operation will be stopped by tripping the control device whenever the stop button 207 is pressed to move the bar 209 toward the left in Fig. 1. The bar 209 carries an upright lug 211 rigidly attached thereto with the rear edge of which a pin 213 engages which is carried on the depending arm 215 of a yoke member 217 which is pivotally supported on the fixed shaft 49. The yoke member 217 also has a depending arm 219 at the left end thereof which carries a pin 221 extending parallel to the shaft 49. The pin 221 engages an upwardly extending projection 223 attached to a bail 225 which is pivotally supported on the shaft 105 and has a barrier portion 227 thereof extending parallel to the shaft 105. The bail 225 is biased by spring 226 upwardly to dispose the barrier 227 in the position shown to engage the end of the upper fork 189 of the key 183.

By pressing the stop button 207 upward pivotal movement of the yoke 217 against the bias of spring 218, Fig. 3, may be effected to produce movement of the projection 223 toward the rear of the register in Fig. 1 and corresponding downward movement of the barrier 227 out of alignment with the fork 189. As shown in Fig. 1, the lower fork of the key is shorter than the upper fork 189 so that the upper fork may pass over the depressed barrier 227 without the end of the lower fork reaching the barrier. When the stop button 207 is held pressed, an individual key 183 then may be actuated repeatedly to bring the pawl 197 carried thereby into engagement with the associated ratchet 181 to effect step by step rotation of the corresponding numeral wheel to the desired numeral. In this manner any selected setting of the digits may be secured for the numeral wheels of the register relative to a fixed mark, such as a window in the casing through which the numeral wheels conventionally are seen. Upon release of the stop button 207 the yoke member 217 and the bail 225 will move reversely.

If the key which has been pressed has not yet been released when the stop button is released, the bail 225 may move up and engage the lower edge of the fork 189 but upon release of the key this fork slides over the top edge of the barrier portion 227 of the bail under the bias of the spring 191 and thereafter the return movement of the yoke 217 and bail 225 are completed to dispose the barrier portion 227 in the path of movement of the forks 189 and the keys.

A shown in Fig. 1, associated with each of the numeral wheels and their selective presetting ratchets 181 is a holding ratchet 231 which is secured to the numeral wheel carrier for rotation with this carrier. The numeral wheel and its selective presetting ratchet, therefore, are rotatable relative to this holding ratchet on the axis of the reset shaft 7. Associated with each of these holding ratchets 231 is a holding pawl 233 which is pivotally supported on a rod 235 extending parallel to the shaft 7 and supported in lugs 237 extending upwardly from the frame 109, the pawls 233 being disposed between two lugs 237. These pawls are biased by springs 239 wrapped around the rod 235 and engaging the bottom edge of the pawl 233 and a portion of the frame 109 adjacent the respective lugs 237. The springs 239 bias the pawls 233 upwardly into engagement with the holding ratchets 231, the pawls 233 each being formed with a point at its upper edge which conforms to the surface of the two adjacent teeth of the ratchets 231 to engage these surfaces so as to prevent rotation of the numeral wheel carrier in either direction during the selective predetermined setting of the numeral wheel on the carrier by the operation of the key 183. The pawls 233 engaging the ratchets 231 also serve to prevent overthrow of the numeral wheels 1, 3 and 5 during rapid operation of the register.

The pawls 233 also are provided with a point at the lower edge thereof which is of such shape and so disposed with respect to the pivot of the pawl 233 that a pin 241 carried by each key comes into engagement with the sloped edge of this downwardly disposed point of the pawl to cam the pawl upwardly into the space between the teeth of the ratchet 231. In the continued movement of the key 183 upon engagement of the hook pawl 197 with the ratchet 181, the pin 241 passes slightly beyond the downwardly extending point of the pawl 233 and in the fully pressed position of the key engages the adjacent sloping edge of this pawl to prevent downward pivotal movement of the pawl 233 out of the space between the teeth of the holding ratchet 231. Thus, during the selective predetermined setting of the numeral wheel, rotation of the carrier is prevented which might otherwise occur upon effecting the selective rotation of the numeral wheel by the operation of the key and engagement of the hook pawl 197 with the ratchet 181. Step by step rotation of the numeral wheel without changing the position of the carrier, therefore, is insured. Upon releasing the key and in its reverse movement, the pin 241 is moved out of engagement with the pawl 233 so that the normal rotation of the numeral wheel with the carrier may take place upon resuming operation of the register. The action described and the function of the pawls 233 is the same for each of the numeral wheels provided in a given register.

A similar holding ratchet 243 is provided for the cam unit which comprises the cams 57, 61, 17. This holding ratchet may have 10 teeth similarly to the holding ratchets 231. A pawl 245 also pivotally supported on the rod 235 between lugs 237 is of similar form to the pawls 233 and engages the ratchet 243 in the same manner, being biased upwardly into engagement with the ratchet 243 by spring 247. A similar holding ratchet 249 is secured on the reset shaft 7 adjacent the reset ratchet member 11. A pawl 251 also pivoted on the rod 235 between lugs 237 engages the ratchet 249 to hold the ratchet member 11 in the position to which it is moved in the step by step rotation by the action of the pawl 9 on the ratchet 11 as above described. Pawl 251 is biased upwardly by spring 252.

Having regard to the fact that the resetting operation of the register is accomplished during the last 10 units of count in the manner above described, in order properly to change the selected or predetermined setting of the numeral wheels on the reset shaft 7 it is necessary to bring this reset shaft to the position in which the numeral wheels thereon are at the previously selected indication. For example, if the selected setting is 344 as shown in Fig. 1 and the register has been operated through part of a cycle to a lower reading, for example 213, and for any reason the measuring and the counting by the register is desired to be stopped, the stop button may be pushed which will trip the control device and move it fully to its stopped position, thus stopping the rotation of the register. Before setting the numeral wheels to any new selected indication it is necessary to rotate the reset shaft manually to bring the indication back from the indication 213 to the previously selected setting. Having regard to the conventional construction of the numeral wheels with respect to the reset pawls contained therein, cooperating with the groove in the reset shaft 7, all of the carriers on which the numeral wheels are supported will be disposed by this manual resetting operation with their reset pawls in engagement with the groove of the reset shaft, so that these carriers in effect are in a zero position. This manual rotation of the reset shaft may be accomplished by a suitable device attached to the right hand end of the shaft 7 in Fig. 1 and may include certain means for preventing overrun which are not part of the present invention and which are omitted in Fig. 1 in the interest of clarity.

When the reset shaft has been rotated clockwise in Fig. 1 thus to dispose the carriers and to bring the indication to the previously set or selected indication, a new selective setting of the numeral wheels may be carried out in the manner above described by step by step pressing of the keys 183 to effect step by step rotation of the ratchets 181 and the associated numeral wheels respectively on the carriers, these carriers being held against rotation as above mentioned by the pawls 233. It will be found when the new or changed selective setting of the register is carried out in this manner that the counting operation, including in its terminal portion the resetting operation, will be completed to return the register to the new selected indication and that this will be accomplished with the automatic operation of the register in the manner above described to change to the resetting operation beginning with the engagement of the hook pawl 67 with the notch 63 of the auxiliary cam 61 as above described.

It will be understood that in completing the operation of resetting the numeral wheels to the selected predetermined indication during the terminal period of the counting operation, the pawl 9 engages the ratchet member 11 for the tenth time and that in the position of the frame 31 as shown in Fig. 1 in which the numeral wheels have just reached the indication 344, the pawl 55 is still riding on the high portion of the cam 57. As may be seen in Fig. 1 the hook 65 of the hook pawl 67 is slightly more than 1/10 of a rotation from engagement with the notch 63 of the cam 61. In the next succeeding rearward movement of the frame 31 the pawl 15 rides upon the high portion 27 of the cam 17 and as the frame reaches its rearward position, the pawl 55 drops behind the toe of the cam 57, thus permitting the toe of the pawl 51 to drop into position to engage the teeth of the feed ratchet 59 of the first numeral wheel. In the next forward movement of the frame 31 to move the first numeral wheel from the numeral 4 to the numeral 3 effecting the first unit of count of the counting operation, the pawl 55 in engagement with the toe of the cam 57 rotates this cam together with cam 61 1/10 of a rotation as the numeral wheel 1 rotates. The notch 63 of the cam 61 becomes positioned for engagement with the hook pawl 67 when the hook pawl 67 subsequently is moved upwardly upon reaching the indication 011 as described.

During this counting operation the cams 57, 61, 17 remain stationary, being held by the holding pawl 245, as described. This position of the cams 57, 61, 17 and the corresponding stationary positions of the ratchet member 11 and of the disc 121 secured thereto and the lug 123 remain unchanged until, on reaching the indication 011 and in the next forward stroke of the frame 31 effecting 1/10 rotation of numeral wheel 1, the bar 103 is cammed downwardly by this first numeral wheel moving the roller 97 out of engagement with the notch of this wheel. In this rotation effected by the hook pawl 67 the cams 57, 61, 17 also are rotated 1/10 of a rotation on the axis of the shaft 7 to move the toe of the cam 57 forwardly of the position which the toe of the pawl 55 reaches in each forward movement thereof and so that the pawl 55 will ride on the high portion of the cam 57; also to dispose the toe 26 of the cam 17 in position so that in the rearward movement of the frame 31 the toe of the pawl 15 will fall behind the toe 26 of the cam 17 with corresponding downward movement of the pawl 9 into engagement with the ratchet member 11 so as to effect the first 1/10 rotation of the ratchet member and of the reset shaft 7 in the next forward movement of the frame 31. During the ten strokes required to complete the reset operation the cams 57, 61, 17 are returned by engagement of pin 115 with toe 117 of cam 17 as above mentioned. The space between toes 117 and 118 of cam 17 provides for movement of the cams 57, 61, 17 relative to the ratchet member 11 in the forward movements of these cams just referred to when the ratchet member 11 is stationary.

It should be understood further that the disc 121 and its lug 123 constitute a timing device which cooperates with the trip element 127, the trip member 163 and the other mechanism described which provide an operative connection between the reset member or ratchet 11 and the device to be controlled, so that initial tripping of the device to be controlled is effected at a predetermined point during the ten steps of rotation of the reset shaft to produce, for example, partial closing of a valve, and that this tripping operation, by the employment of suitable releasing mechanism in connection with the control device, is completed concomitantly with completion of the resetting and with the return movement of the frame 31 to the position from which in the next forward movement thereof the next counting cycle is started with a 1/10 rotation of the first numeral wheel. It is significant in the invention that the initial actuation of the tripping element produces a forward movement of a trip member connected to the control device and in the final completion of the tripping this trip member is moved reversely into position for resetting of the releasing mechanism provided at the control device.

In Fig. 1 is shown a short bent lever 261 which is pivotally supported on the reset shaft 7. This lever provides at the portion thereof extending rearwardly of the shaft 7 a cam surface 263 which extends about the axis of the shaft 7 but is not concentric therewith. This cam surface 263, upon pivotal movement of the lever 261 on the shaft 7 in the clockwise direction in Fig. 1, is brought into engagement with a stud 265 which is carried on the extending portion of a pawl lifting yoke 267 which is pivotally carried on the shaft 21 on which all of the pawls for engaging the ratchets are pivotally supported. The lengthwise portion 269 of the yoke 267 which extends parallel to the shaft 21 is disposed for engagement with the rear ends 271 of the several pawls upon downward movement of the portion 269.

It will be understood from a consideration of Figs. 1 and 2 that clockwise movement of the lever 261 to bring the cam surface 263 into engagement with the stud 265 will effect downward movement of the lengthwise portion 269 of the yoke into engagement with the rear ends 271 of all of the pawls to effect lifting movement of all of the toes of the pawls out of engagement with the ratchets or with the notches of the cams which they are intended normally to engage. Such simultaneous camming action of all of the pawls may be desirable for the purpose of effecting operation of an integrating register with which the predetermining register of the invention may be connected without operating the predetermining register or for separate reverse rotation of the numeral wheels individually, that is, in the counterclockwise direction, Figs. 1 and 2, which would not be possible if the pawls associated with the ratchets of these wheels were in engagement.

The yoke 267 is biased by a spring 272 wrapped around the shaft 21 and engaging a lug 273 carried by the bar 35 of the frame 31, this spring engaging also the lower edge of the lengthwise portion 269 of the yoke 267 to bias the yoke clockwise so that the upper edge of the lengthwise portion 269 engages a lug 275 extending rearwardly from the bar 35. Thus, the lengthwise portion 269 of the yoke is biased to its normal position out of engagement with the rear ends 271 of the pawls, the cam 263 effecting movement of the yoke 267 against the bias of the spring 272 to effect the lifting of the pawls as described.

The edge 147 described above as an edge of opening 149, Fig. 3, preferably is provided, as shown, at the end of a horizontal arm of a bell crank 280 having a lug 282 disposed in a slot in the portion 151 of forked arm 41 and biased clockwise by spring 284 to the position shown. In the event that in the reciprocating movement of the forked arm 41 and upward movement of the square peg 143 this lug should engage the bottom edge of the bell crank 280, this bell crank will rotate on its pivot against the bias of spring 284 to permit the lug 143 to move to the upper level. As the movement of the portion 151 toward the left occurs, the end of the bell crank will drop into the position shown for engagement with the lug 143 to effect movement of the trip member 163 toward the right as described.

Within the scope of the invention other forms of the various members may be utilized without departing from the purposes and functions of those disclosed and described in connection with the drawings. Such modifications are intended to come within the scope of the present invention as defined in the appended claims.

We claim:

1. A predetermining register comprising a reset shaft, a plurality of numeral wheels mounted on said shaft in spaced relation therealong for rotation relative to said shaft on the axis thereof, said numeral wheels carrying digits circumferentially spaced thereon in numerical order about said axis, transfer means operatively connected to said numeral wheels and operative upon rotation of a wheel of lower order to a predetermined position for indexing the wheel of next higher order, means carried by the respective numeral wheels and operatively connectible to said reset shaft upon rotation of said reset shaft in a predetermined direction to reset said numeral wheels to respective positions with selected digits of the respective wheels adjacent a reference mark, a member carried by and connected to said shaft for rotation therewith, means supported for movement thereof between two control positions and actuated by said numeral wheels in the rotation thereof to a given one of said control positions at positions of said numeral wheels relative to said reference mark determining a given indication of digits on said wheels, said means movable between two control positions being actuated by said numeral wheels to the other of said two control positions upon rotation of said numeral wheels a predetermined number of digits from said given indication, a driving mechanism operatively connectible to said numeral wheels and operable upon such connection to said numeral wheels to effect step by step rotation of said numeral wheels in a given direction of the order of their digits, said driving mechanism being operatively connectible to said member and operable upon such connection to said member for effecting step by step rotation of said member and said reset shaft, and an operative connection between said means movable between two control positions and said driving mechanism and operable for disconnecting said driving mechanism from said numeral wheels and concomitantly connecting said driving mechanism to said member upon actuation of said means movable between two control positions from said given and to said other control position so as to initiate resettting operation of said shaft.

2. A predetermining register as defined in claim 1 in which said member carries a trip lug, a trip element operatively connectible to a device to be tripped, said trip element being disposed adjacent said member and engaged by said lug in the position of said member in which said selected digits of said numeral wheels are disposed adjacent said reference mark to hold said strip element in position for operation of said device during rotation of said numeral wheels from said position of said numeral wheels with said selected digits adjacent said reference mark to said position of said numeral wheels determining said given indication of digits, said trip element being disengaged from said lug to effect tripping of said device in a succeeding position of said member in the rotation of said member operatively connected to said driving mechanism during said resetting operation of said numeral wheels to said position with said selected digits adjacent said mark.

3. A predetermining register as defined in claim 2 in which said trip element is operatively connected to a trip member of said device, said trip member being supported for movement thereof in a given direction from a position for operation of said device to a preliminary tripping position partially releasing said device and reversely to a second completely tripping position fully releasing said device, said trip element being operatively connected to said trip member to effect said movement of said trip member in said driven direction concomitantly with movement of said lug toward said disengaging position, said trip element being operatively connected to said trip member for effecting said reverse movement of said trip member upon re-engagement of said lug with said trip element concomitantly with completion of the resetting of said numeral wheels to said position with selected digits adjacent said reference mark.

4. A predetermining register comprising a reset shaft, a plurality of numeral wheel carriers mounted on said shaft in spaced relation therealong for rotation relative to said shaft on the axis thereof, numeral wheels mounted respectively on said carriers and carrying digits circumferentially spaced thereon in numerical order about said axis, said numeral wheels being rotatable on the axis of the shaft relative to the respective carriers to different selected positions of the numeral wheel digits with respect to the respective carriers, transfer means operatively connected to said numeral wheel carriers and operative upon rotation of a carrier of lower order to a predetermined position relative to the numeral wheel carrier of next higher order for indexing said numeral wheel carrier of next higher order, means carried by the respective numeral wheel carriers and operatively connectible to said reset shaft upon rotation of said reset shaft in a predetermined direction to reset said numeral wheel carriers to respective predetermined positions with respect to a reference mark disposed adjacent said digital circumferences of the respective numeral wheels, a member carried by and connected to said shaft for rotation therewith, reciprocable means supported for movement thereof between two control positions and actuated by said numeral wheels to a given one of said control positions at the positions of said wheels relative to said reference mark determining a given combination of digits on said wheels, said reciprocable means being actuated to the other of said two control positions upon rotation of said numeral wheels one digit on the lower order wheel from said given combination, a driving mechanism operatively connectible to said numeral wheel carrier of lowest order and operable upon such connection to effect step by step rotation of said lowest order numeral wheel carrier and said numeral wheel thereon in the direction of decreasing order of the digits of said numeral wheel and concomitant indexing rotation of said carriers and wheels of higher order, said driving mechanism being operatively connectible to said member and operable upon such connection for effecting step by step rotation of said member and said reset shaft in said predetermined direction, and an operative connection between said reciprocable means and said driving mechanism and operable for disconnecting said driving mechanism from said numeral wheel carrier of lowest order and concomitantly connecting said driving mechanism to said member upon actuation of said reciprocable means to said given and to said other control positions in succession so as to effect resetting operation of said reset shaft and said carriers to said predetermined position of said carriers with respect to said reference mark by continued opertion of said driving mechanism connected to said member.

5. A predetermining register as defined in claim 4 which comprises setting elements supported for movement thereof into and out of engagement with the respective numeral wheels for effecting rotation of said numeral wheels with respect to the respective numeral wheel carriers to set selected digits of said numeral wheels adjacent said reference mark upon actuation of the respective setting elements.

6. A predetermining register as defined in claim 5 which comprises stop means disposed in relation to said setting elements to restrain said setting elements from movement into engagement with said numeral wheels, and a member operatively connected to said stop means and operable to effect movement of said stop means out of position restraining said setting elements to provide for actuation of said setting elements.

7. A predetermining register as defined in claim 6 which comprises means connected to said stop means for biasing said stop means to the position restraining said setting elements from engagement with said numeral wheels.

8. A predetermining register as defined in claim 5 in which said setting elements respectively are biased out of engagement with the respective numeral wheels and are operable against said bias to effect said engagement of said elements with the respective wheels.

9. A predetermining register as defined in claim 4 which comprises detent ratchets carried by said numeral wheel carriers for rotation therewith, and detent pawls biased into engagement with said ratchets for holding said detent ratchets and said carriers in the respective position to which said carriers are moved in said step by step rotation thereof driven by said driving mechanism.

10. A predetermining register as defined in claim 4 which comprises setting elements respectively associated with said numeral wheels and supported for movement thereof into and out of engagement with the respective numeral wheels for effecting concomitantly with such engagement rotation of the respective wheels relative to the carriers on which said numeral wheels are mounted, and means carried by said setting elements and respectively engaging said numeral wheel carriers in the position of the respective setting elements in engagement with said numeral wheels for preventing rotation of said numeral wheel carriers on said axis during said rotation of the respective numeral wheels with respect to said numeral wheel carriers.

11. A predetermining register comprising a reset shaft, a plurality of numeral wheel carriers mounted on said shaft in spaced relation therealong for rotation relative to said shaft on the axis thereof, numeral wheels mounted respectively on said carriers and carrying digits disposed in numerical order in equally spaced relation circumferentially about the axis of said shaft, said numeral wheels being rotatable on the axis of the shaft relative to the respective carriers to different selected positions of the numeral wheel digits with respect to the respective carriers, transfer means operatively connected between each numeral wheel carrier and the numeral wheel carrier of the next higher order and operative upon rotation of the carrier of lower order to a predetermined position relative to the numeral wheel carrier of next higher order for indexing said numeral wheel carrier of next higher order one digit, means carried by the respective numeral wheel carriers and operatively connectible to said reset shaft upon rotation of said reset shaft in a predetermined direction to reset said numeral wheel carriers to respective predetermined positions with respect to a reference line parallel to said reset shaft, a ratchet member carried by and connected to said shaft for rotation therewith, said ratchet member having teeth in number equal to the number of digits carried upon said numeral wheel of lowest order, reciprocable means supported for movement thereof forwardly and reversely between two control positions and actuated by said plurality of numeral wheels to a given one of said control positions of said reciprocable means at the positions of said numeral wheels relative to said reference line determining a given combination of digits on said numeral wheels which is greater by one digit on said wheel of lowest order than the number of teeth carried on said ratchet member, said reciprocable means being actuated by said numeral wheels to the other of said two control positions upon rotation of said numeral wheel of lowest order one digit in the decreasing direction from said given combination, a reciprocable driving mechanism operatively connectible to said numeral wheel carrier of lowest order and operable when so connected upon reciprocation of said driving mechanism to effect step by step rotation of said lowest order numeral wheel carrier and said numeral wheel thereon in the direction of decreasing order of the digits on said lowest order numeral wheel and concomitant indexing rotation of said wheels of higher order, said driving mechanism being operatively connectible to said ratchet member and operable when so connected upon reciprocation of said mechanism for effecting step by step rotation of said ratchet member and said reset shaft in said predetermined direction, reset control means operatively connected to said reciprocable means and to said driving mechanism in said given control position of said reciprocable means for effecting connection of said driving mechanism to said numeral wheel carrier of lowest order to effect rotation of said lowest order carrier and wheel one digit in said decreasing direction upon the next reciprocation of said driving mechanism, and means actuated by said reset control means concomitantly with said one digit rotation of said lowest order carrier and wheel for disestablishing said connection of said driving mechanism to said lowest order carrier and wheel and establishing connection of said driving mechanism to said ratchet member for effecting rotation of said ratchet member and said reset shaft in steps in number equal to the number of digits carried on said numeral wheel of lowest order concomitantly to reset said numeral wheel carriers to said predetermined positions of said carriers with respect to said reference line parallel to said reset shaft.

12. A predetermining register as defined in claim 11 in which said numeral wheels of the respective carriers respectively are provided with notches in the circumferences thereof disposed in a predetermined circumferential relation to the respective digits of said given combination of digits on said numeral wheels, said reciprocable means comprising elements respectively disposed adjacent said notched circumferences of said numeral wheels for movement of said elements into and out of the respective notches in said forward and reverse movements of said reciprocable means concomitantly with rotation of said numeral wheels.

13. A predetermining register as defined in claim 12 in which each of said numeral wheels carries ten digits disposed circumferentially in equally spaced numerical order thereon, the notches in said numeral wheels being disposed in a predetermined circumferential relation respectively to the digits of the combination 011 as said given combination to provide for movement of said elements into said notches and movement of said reciprocable means to said given control position in the position of said numeral wheels in which said combination 011 is adjacent said reference line parallel to the reset shaft, said elements being cammed out of said notches by said numeral wheels in the movement of said numeral wheels from said given combination 011 to the combination 010 to actuate said reciprocable means to the other of said two control positions.

14. A predetermining register as defined in claim 11 in which said reset control means comprises a cam member rotatable on the axis of and relative to said reset shaft, an operative connection between said reciprocable means and said cam member for effecting rotation of said cam member equal to said one digit rotation of said numeral wheels from said given combination concomitantly with movement of said reciprocable means to said other control position thereof, an actuating element operatively connected to said driving mechanism and operable between positions of actuating said lowest order numeral wheel carrier and of disconnection therefrom, said cam member having a lobe disposed in a predetermined circumferential relation to said actuating element about said shaft axis for operating said element to the position of disconnection thereof and of said driving mechanism from said lowest order carrier concomitantly with said one digit rotation of said lowest order wheel, a pawl supported for movement thereof into and out of engagement with the teeth of said ratchet member and operatively connected to said driving mechanism for effecting rotation of said ratchet member upon engagement of said pawl with said ratchet member teeth in the operation of said driving mechanism, said cam member having a second lobe disposed in a predetermined circumferential relation to said first lobe about said axis for engagement with said pawl to hold said pawl out of engagement with said ratchet member teeth during driving operation of said numeral wheels by said actuating element and to move said pawl into engagement with said ratchet member teeth upon rotation of said cam member concomitantly with said disconnection of said actuating element and said driving mechanism from said lowest order numeral wheel in said one digit rotation of said numeral wheel from the position of said given combination to initiate resetting operation of said reset shaft.

15. A predetermining register as defined in claim 14 in which said ratchet member has ten teeth, said lobes of said cam being disposed for maintaining said actuating element out of position actuating said lowest order wheel carrier and disconnection of said driving mechanism from said lowest order wheel carrier and for maintaining said pawl in engagement with the teeth of said ratchet member during rotation of said ratchet member and said shaft through one revolution corresponding to ten digits on said lowest order numeral wheel to reset said shaft and numeral wheels to said predetermined position with respect to said reference line.

16. A predetermining register as defined in claim 11 which comprises a detent ratchet carried by said ratchet member for rotation therewith, and a detent pawl biased into engagement with said detent ratchet of said ratchet member for holding said ratchet member in the respective positions thereof to which said ratchet member is moved in said step by step rotation of said ratchet member in said predetermined direction effected by said driving mechanism.

17. A predetermining register as defined in claim 11 in which said reciprocable means comprises a pawl connected to said reciprocable means for movement of said pawl forwardly and reversely to and from a ratchet engaging position, said reset control means comprising a one-tooth ratchet supported for rotation on the axis of said reset shaft relative to said shaft and relative to said numeral wheel carriers, said one-tooth ratchet being operatively connected to said numeral wheel carrier of lowest order in said given control position of said reciprocable means in which said numeral wheels determine said given combination of digits, said pawl being engageable with said tooth of said one-tooth ratchet in said position of said numeral wheels determining said given combination of digits for effecting said one digit rotation of said numeral wheel of lowest order in decreasing direction upon the next reciprocation of said reciprocable driving mechanism.

18. A predetermining register as defined in claim 17 in which said reset control means comprises a pair of cams connected for rotation together on the axis of said shaft and relative to said shaft, a feed pawl, and a recycle pawl, said pawls being operatively connected to said driving mechanism and supported for movement thereof into and out of engagement respectively with said numeral wheel of lowest order and with said ratchet member for effecting said driving of said lowest order numeral wheel and of said ratchet member respectively upon such engagement, said pawls being disposed for camming action thereon respectively by said cams to effect said movements respectively out of and into engagement with said lowest order wheel and with said ratchet member concomitantly with said one-tooth rotation of said one-tooth ratchet and said one digit rotation of said lowest order numeral wheel.

19. A predetermining register comprising a reset shaft, at least two numeral wheel carriers mounted on said shaft in spaced relation therealong for rotation relative to said shaft on the axis thereof, numeral wheels mounted respectively on said carriers and each carrying ten digits 0 to 9 disposed in numerical order in equally spaced relation circumferentially about the axis of said shaft, said numeral wheels being rotatable on the axis of the shaft relative to the respective carriers to different selected positions of the numeral wheel digits with respect to the respective carriers, transfer means operatively connected between said two numeral wheel carriers and operative upon rotation of the carrier of lower order to a predetermined position relative to the numeral wheel carrier of higher order for indexing said higher order wheel carrier one digit, means carried by the respective numeral wheel carriers and operatively connectible to said reset shaft upon rotation of the reset shaft in a predetermined direction to reset said numeral wheel carriers to respective predetermined positions with respect to a reference line parallel to said reset shaft, said numeral wheel carrier of lower order carrying a feed ratchet coaxial therewith and having ten teeth for effecting rotation of said carrier upon driving rotation of said ratchet, a feed pawl supported for movement thereof toward and away from said feed ratchet and for reciprocating rotational movement of said pawl about the axis of said shaft for effecting step by step rotation of said feed ratchet and said numeral wheel carrier of lower order upon said axis by engagement of said pawl with said feed ratchet, a ratchet member having ten teeth equally spaced circumferentially about said axis, said ratchet member being carried by and connected to said shaft for rotation therewith, reciprocable means supported for movement thereof forwardly and reversely between two control positions and actuated by said numeral wheels to a given one of said control positions of said reciprocable means at a position of said numeral wheels relative to said reference line determining the combination of digits 011 on said numeral wheels, said reciprocable means being actuated to the other of said two control positions upon rotation of said numeral wheel of lower order one digit to the combination 010 on said number wheels, a reciprocable driving mechanism operatively connected to said feed pawl for effecting step by step rotation of said feed ratchet and said numeral wheel of lower order upon engagement of said feed pawl with said feed ratchet, a recycle pawl supported for movement thereof toward and away from said ratchet member and operatively connected to said driving mechanism for effecting step by step rotation of said ratchet member and said reset shaft in said predetermined direction upon engagement of said recycle pawl with said ratchet member, and a cam member supported on said shaft for rotation relative thereto and providing two lobes respectively disposed for engagement with said feed pawl and said recycle pawl to dispose said pawls respectively outwardly from and inwardly toward said axis with respect to the respective ratchets in the positions of said lobes about said axis in which said numeral wheels are in said combination of digits 010 so as to transfer the driving connection of said reciprocable driving mechanism from said feed ratchet of said numeral wheel of lower order to said ratchet member for resetting operation of said reset shaft.

20. A predetermining register as defined in claim 19 in which the form and disposition of said cam lobes with respect to each other are effective to release said feed pawl from said outward position for movement thereof into engagement with said feed ratchet and concomitantly to dispose said recycle pawl outwardly of said axis with respect to said ratchet member so as to reestablish driving connection of said driving mechanism to said numeral wheel of lower order and to disestablish driving connection of said driving mechanism to said ratchet member upon completion of 10 steps in one revolution of said ratchet member about said axis from said position of said wheels in the combination 010 to said predetermined positions of said wheels with respect to said reference line.

21. A predetermining register as defined in claim 19 in which said cam member provides a recess having an extent circumferential about said axis, said ratchet member carrying a lug projecting from said ratchet member into said recess for engagement with said cam member to effect rotation thereof upon rotation of said ratchet member, the extent of said recess about said axis being sufficient to provide lost motion between said cam member and said ratchet member to provide for movement of said cam member relative to said ratchet member concomitantly with the movement of said reciprocable means to said other of said control positions, said recess being disposed about said axis for driving of said cam member by said lug to said position of said cam member in which said lobe thereof engaging said feed pawl releases said feed pawl for movement into engagement with said feed ratchet.

22. A register comprising a numeral wheel carrier supported for rotation thereof on an axis, a numeral wheel mounted on said carrier and carrying digits circumferentially spaced on said numeral wheel about said axis, said numeral wheel being rotatable on said axis relative to said carrier to different selected positions of the numeral wheel digits with respect to said carrier, a setting element supported for movement thereof into and out of engagement with said numeral wheel for effecting concomitantly with such engagement rotation of said numeral wheel with respect to said numeral wheel carrier, detent means supported for movement into and out of engagement with said numeral wheel carrier for preventing rotation of said numeral wheel carrier on said axis, and means carried by said setting element and engaging said detent means in the position of said setting element in engagement with said numeral wheel for effecting engagement of said detent means with said numeral wheel carrier for preventing rotation of said numeral wheel carrier on said axis during said rotation of said numeral wheel with respect to said numeral wheel carrier.

23. A register comprising a reset shaft, a numeral wheel mounted on said shaft for rotation relative to said shaft on the axis thereof, said numeral wheel carrying digits circumferentially spaced thereon in numerical order about said axis, means carried by said numeral wheel and operatively connectible to said reset shaft upon rotation of said reset shaft in a predetermined direction to reset said numeral wheel to a position with a selected digit thereof adjacent a reference mark, a member carried by and connected to said shaft for rotation therewith, control determining means supported for movement thereof between two control positions and actuated by said numeral wheel in the rotation thereof to a given one of said control positions at a position of said numeral wheel relative to said reference mark determining a given digit on said wheel, said control determining means being actuated by said numeral wheel to the other of said two control positions upon rotation of said numeral wheel a predetermined number of digits from said given indication, a driving means, and control means operatively connected to said control determining means and operatively connectible to said driving means and actuated by said control determining means to connect said driving means to said numeral wheel to drive said numeral wheel in step by step rotation concomitantly with movement of said control determining means to said given control position and to connect said driving means to said member concomitantly with movement of said control determining means to said other control position and disconnection of said driving means from said numeral wheel to provide for resetting operation of said shaft and numeral wheel.

24. A register comprising a reset shaft, a wheel mounted on said shaft for rotation relative to said shaft on the axis thereof, means carried by said wheel and operatively connectible to said reset shaft upon rotation of said reset shaft in a predetermined direction to reset said wheel to an initial position, a member carried by and connected to said reset shaft for rotation therewith, control determining means supported for movement thereof between two control positions and actuated by said wheel to a given one of said control positions at a selected position of said wheel in the rotation thereof, said control determining means being actuated by said wheel to the other of said two control positions upon rotation of said wheel a predetermined amount from said selected position, driving means, and control means operatively connected to said control determining means and operatively connectible to said driving means and actuated by said control determining means to connect said driving means to said wheel to drive said wheel concomitantly with movement of said control determining means to said given control position, said control means being actuated by said control determining means concomitantly with movement of said control determining means to said other control position to effect disconnection of said driving means from said wheel and connection of said driving means to said member to provide for resetting operation of said reset shaft and said wheel.

References Cited in the file of this patent

UNITED STATES PATENTS

| | | |
|---|---|---|
| 2,137,013 | Bradley | Nov. 15, 1938 |
| 2,538,988 | Toby | Jan. 23, 1951 |